United States Patent
Cenci et al.

(10) Patent No.: US 8,877,066 B2
(45) Date of Patent: Nov. 4, 2014

(54) METHOD FOR MONITORING AND CONTROLLING THE CHEMISTRY OF A ZLD PROCESS IN POWER PLANTS

(75) Inventors: Vincenzo Cenci, Leghorn (IT); Claudio Mosti, Florence (IT)

(73) Assignee: Enel Produzione S.p.A., Rome (IT)

(*) Notice: Subject to any disclaimer, the term of this patent is extended or adjusted under 35 U.S.C. 154(b) by 0 days.

(21) Appl. No.: 14/110,416

(22) PCT Filed: Apr. 6, 2012

(86) PCT No.: PCT/IB2012/051724
§ 371 (c)(1),
(2), (4) Date: Nov. 18, 2013

(87) PCT Pub. No.: WO2012/137183
PCT Pub. Date: Oct. 11, 2012

(65) Prior Publication Data
US 2014/0054230 A1    Feb. 27, 2014

(30) Foreign Application Priority Data

Apr. 8, 2011  (IT) ................ FI2011A0063

(51) Int. Cl.
| | | |
|---|---|---|
| *C02F 1/00* | (2006.01) | |
| *C02F 9/00* | (2006.01) | |
| *C02F 5/00* | (2006.01) | |
| *B01D 1/00* | (2006.01) | |
| *C02F 1/04* | (2006.01) | |
| *C02F 1/42* | (2006.01) | |
| *C02F 1/52* | (2006.01) | |
| *C02F 101/10* | (2006.01) | |
| *C02F 103/18* | (2006.01) | |

(52) U.S. Cl.
CPC . *C02F 9/00* (2013.01); *C02F 1/008* (2013.01); *C02F 5/00* (2013.01); *B01D 1/0082* (2013.01); *C02F 1/042* (2013.01); *C02F 1/42* (2013.01); *C02F 2001/5218* (2013.01); *C02F 2101/101* (2013.01); *C02F 2103/18* (2013.01); *C02F 2209/02* (2013.01); *C02F 2209/05* (2013.01); *C02F 2209/055* (2013.01); *C02F 2209/06* (2013.01); *C02F 2209/07* (2013.01)
USPC .......................................... 210/709; 210/710

(58) Field of Classification Search
CPC ............. C02F 1/008; C02F 1/042; C02F 5/00
USPC ....................................................... 210/709
See application file for complete search history.

(56) References Cited

FOREIGN PATENT DOCUMENTS

| | | |
|---|---|---|
| EP | 0302522 | 8/1989 |
| EP | 1110595 | 6/2001 |

OTHER PUBLICATIONS

PCT International Search Report mailed on Jun. 13, 2012 for PCT Application PCT/IB2012/051724 filed on Apr. 6, 2012 in the name of Enel Produzione S.P.A.

(Continued)

*Primary Examiner* — Tony G Soohoo
*Assistant Examiner* — Peter Keyworth
(74) *Attorney, Agent, or Firm* — Steinfl & Bruno, LLP

(57) ABSTRACT

A method for monitoring and controlling the chemistry of a Zero Liquid Discharge (ZLD) process in power plants is described. The method identifies the principal phenomena of precipitation of calcium sulphate and calcium carbonate which can occur in such system and the principal critical sections affected by such precipitation phenomena. The interventions aimed at keeping or restoring the sustainable chemical conditions with respect to the precipitation of calcium sulphate and calcium carbonate in all the critical sections of the ZLD system are then indicated, ensuring saturation ratios of calcium sulphate and calcium carbonate lower than or equal to 1 through time.

7 Claims, 2 Drawing Sheets

(56) References Cited

OTHER PUBLICATIONS

PCT Written Opinion mailed on Jun. 13, 2012 for PCT Application PCT/IB2012/051724 filed on Apr. 6, 2012 in the name of Enel Produzione S.P.A.

PCT International Preliminary Report on Patentability completed on Aug. 14, 2013 for PCT Application PCT/IB2012/051724 filed on Apr. 6, 2012 in the name of Enel Produzione S.P.A.

Siegworth, A., et al., Case study: Integrating membrane processes with evaporation to achieve economical zero liquid discharge at the Doswell Combined Cycle Facility, Desalination 1995, 102: 81-86.

METHOD FOR MONITORING AND CONTROLLING THE CHEMISTRY OF A ZLD PROCESS IN POWER PLANTS

CROSS REFERENCE TO RELATED APPLICATIONS

The present application is the US national stage of International Patent Application PCT/IB2012/051724 filed on Apr. 6, 2012 which, in turn, claims priority to Italian Patent Application FI2011A000063 filed on Apr. 8, 2011.

The present invention concerns a method for monitoring and controlling the chemistry of a Zero Liquid Discharge (hereinafter referred to as "ZLD") process in power plants.

As known, numerous processes are implemented and plants are installed for the treatment of combustion flue gas aimed at removing SOx, NOx and solid particulate before their emission into the atmosphere.

In particular, the most widespread technologies for desulfurizing the flue gas produced by coal combustion are those of the West Limestone Gypsum Forced Oxidation kind, i.e. DeSOx wet systems fed with calcium carbonate which capture $SO_2$ in exchange for gypsum as final product.

These processes inevitably generate a stream of liquid waste necessary to keep their chemical-physical parameters under control and, therefore, ensure their correct functioning. The so produced wastes are traditionally treated in dedicated plants which ensure the respect of the laws in force in relation to discharge into surface waters. These plants provide for the precipitation of metals through dosage of calcium hydroxide, ferric chloride, sodium sulfide, iron chloride and polyelectrolyte, with a final stage of pH adjustment before discharge.

The following Table 1 shows the average chemical-physical characteristics of the wastes coming from desulfurizing plants.

TABLE 1

| | |
|---|---|
| pH | 4-6.5 |
| $Ca^{++}$ [mg/L] | 1.000-15.000 |
| $Mg^{++}$ [mg/L] | 50-1.500 |
| $Na^+$ [mg/L] | 300-1.500 |
| $Cl^-$ [mg/L] | 1.200-30.000 |
| $SO_4^{--}$ [mg/L] | 1.000-6.000 |
| $NO_3^-$ [mg/L] | 50-1.000 |
| $F^-$ [mg/L] | 10-30 |
| $NH_4^+$ [mg/L] | 10-100 |
| $SiO_2$ [mg/L] | 5-20 |
| TDS [mg/L] | 10.000-50.000 |

In order to eliminate the discharge of water coming from the treatment of desulfurization wastes into surface waters for which they were originally intended, plants for the evaporation of such water have been installed downstream of these plants. The technology necessary for the functioning of such plants, called Softening-Evaporation-Crystallization (SEC) plants, was developed in the United States of America in order to recover water used for the production of electric energy in desert areas, thus reducing its consumption from external sources at a minimum.

The evaporation of the liquid waste is a two-steps process: the first step, called Brine Concentration, carries out the concentration in a thin-layered exchanger with a "seeded slurry" mechanism and mechanical recompression of steam; the second step, called Crystallization, arranges for a flash of the brine fed through heating in an external exchanger with forced circulation. The evaporation produces a very high quality distillate (Conductivity<100 $\mu S/cm^2$) suitable for recovery and a dehydrated solid (Moisture<25%) intended for disposal in a landfill. The liquid waste is prepared for evaporation in a preliminary softening step in which, through dosage of sodium carbonate, control of the concentration of the incoming calcium is achieved, to keep the functioning of Brine Concentrators in the "seeded slurry" mode.

In areas where availability of water is appropriate, water saving can be considered as a secondary advantage, while significant is the environmental advantage.

This evaporation and recovery system which eliminates the liquid waste deriving from desulfurization takes the name of Zero Liquid Discharge (ZLD) system. Also "traditional" liquid wastes coming from the productive plant, such as acid/alkaline water coming from regeneration of mixed beds, sewer water of toilets, meteoric waters gathered in the plants' yards, are recovered in such system, so that today the plants provided with such system continuously operate in a "zero discharge" mode.

The practical application of ZLD systems in power plants comprising a treatment for desulfurizing flue gas is a challenge with no precedent given the great difficulty in controlling the chemistry of waters due to the exceptional variability in the quality of the fuel fed, today purchased on the international market.

Under these boundary conditions, the systems operating in continuous have therefore shown some critical process aspects deriving from the "zero discharge" mode, i.e. critical aspects connected to the phenomenon of salts concentration typical of those configurations having no waste, or limited waste.

In the case at issue, the only wastes of salts are represented by the solid residues produced during the evaporating step of the plant SEC, by the sludges produced in the treatment plant for desulfurizing wastes and by the sludges produced in the plant for the treatment of "traditional" waste waters, any other possibility to unburden the system being eliminated by the opening of a liquid waste.

At the same time, in addition to the contribution given by the fuel, the balance of matter worsened because of the chemical species introduced through the dosage of reagents or present in low-salinity make-up waters. The water evaporated in desulfurizers has by its very nature almost zero salinity, with a concentrating overall effect.

The continuous and prolonged operation of these plants therefore leads to widespread scales of calcium salts in the whole system which impair its functioning to such an extent that today the use of a ZLD system in power plants with treatment for desulfurizing flue gas is hardly feasible.

Subject of the present invention is a method for monitoring and controlling the chemistry of a Zero Liquid Discharge (ZLD) process in power plants, in particular those comprising plants for desulfurizing the flue gas produced by coal combustion or fossil fuel in general.

This is achieved by the method according to the present invention for monitoring and controlling the chemistry of a Zero Liquid Discharge (ZLD) process used in power plants, whose essential features are as defined in claim 1. Further important features are defined in the dependent claims.

Features and advantages of the method according to the present invention will be apparent from the following description of an embodiment thereof, given as a non-limiting example with reference to the attached drawings, wherein.

Figure 1:
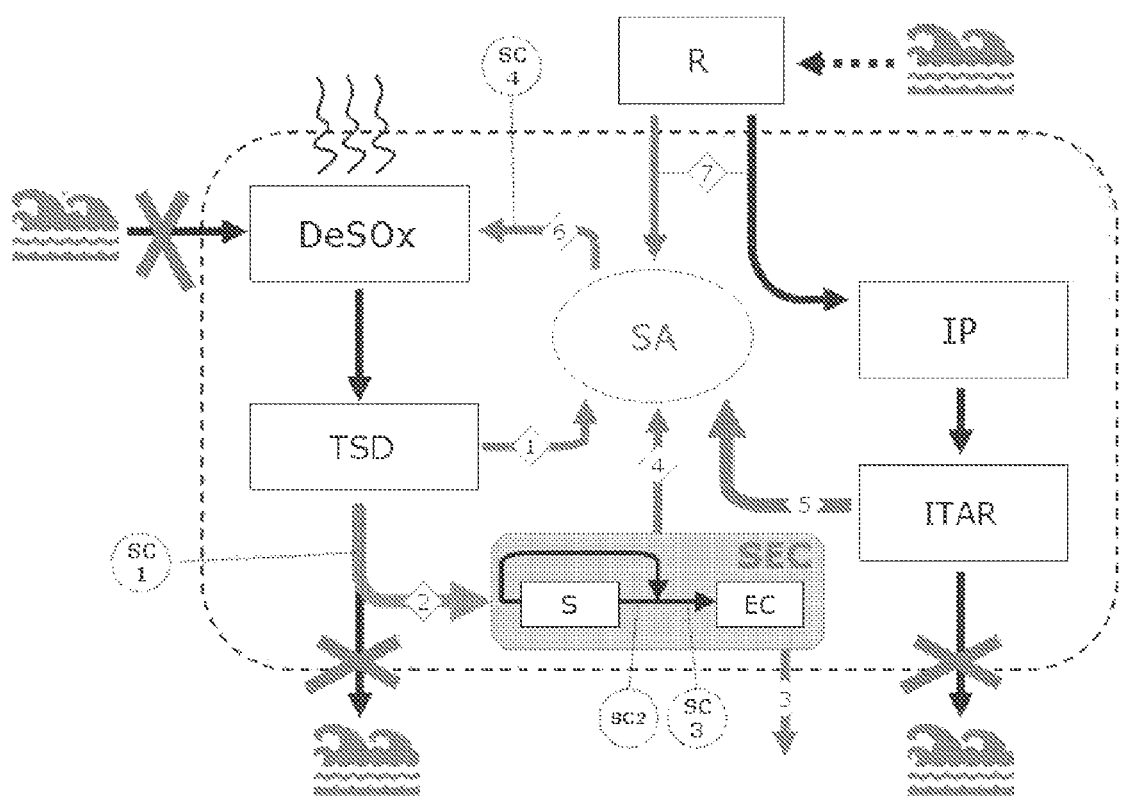
FIG. 1 shows a block diagram of a ZLD system.

With reference to FIG. 1, a ZLD system provides for the combustion flue gas to be treated to lower $SO_x$ in a conventional DeSOx plant and for the liquid stream coming from them to be treated in a DeSOx waste treatment unit (i.e. Treatment-Storage-Disposal or TSD), as already briefly described. A fraction 1 of the liquid stream coming out from the DeSOx waste treatment unit TSD is sent to a storage tank SA, while the remaining fraction 2 is sent to an evaporation SEC (Softening-Evaporation-Crystallization) plant, also already briefly described. From the evaporation SEC plant a dehydrated solid (Moisture<25%) for disposal in a landfill, indicated as 3, and a liquid stream 4 sent to the storage tank SA, comes out. The stream 4 comprises the distillate produced during the evaporation/crystallization (EC) and the fraction of non-evaporated softened water recovered directly in the tank SA. Also the liquid wastes 5 of the productive plant IP and the sewer waters of toilets flow into the latter tank upon treatment in the treatment plant for liquid waste (ITAR). Also a make-up low-salinity water 7 coming from external sources R such as wells, consortia, public waterworks, etc., is sent to the tank SA, and to the productive plant IP. The water collected in the storage tank SA is fed (stream 6) to the DeSOx plant.

According to the present invention, some sections of the ZLD system, hereinafter referred to as "critical sections", have been identified, wherein the localized saturation of calcium salts has had a higher relevance and impact on the functioning of the thermoelectric units.

Table 2 hereunder lists the critical sections with the indication of the degree of saturation of calcium sulphate and calcium carbonate, i.e. those salts which have shown the greater tendency to precipitate in an uncontrolled manner. The evaluation of the saturation degree is accomplished by evaluating the saturation ratios calculated as follows:

RS calcium sulphate=$[Ca^{++}][SO^=]/K_{ps}$, wherein:
$[Ca^{++}]$ and $[SO4^=]$ are the measured concentrations;
$K_{ps}$ is the constant of solubility at the temperature of measure;
RS calcium carbonate=$10^{(pH-pHs)}$, wherein:
pH is the measured pH;
pHs is the saturation pH.
The difference pH-pHs is the Langelier index.

Therefore, the saturation ratios provide an indication of the scaling potential of waters in operating conditions with reference to the compound for which it is calculated.

TABLE 2

| Stream | Saturation of calcium sulphate | Saturation of calcium carbonate |
|---|---|---|
| Outlet of the DeSOx waste treatment plant (SC1) | Potentially high | Usually low |
| Outlet of the DeSOx waste softening (SC2) | Usually low | Potentially high |
| Feeding of the evaporation step of SEC (SC3) | Potentially relevant | Potentially high |
| DeSOx make-up from the storage tank (SC4) | Potentially high | Potentially high |

The critical sections SC1-SC4 shown above are also indicated in FIG. 1.

To keep the chemistry of the ZLD process under control, the steps herebelow are followed:

a) periodically monitoring, for example daily, the critical sections SC1-SC4 listed in Table 2, by means of sampling aimed at determining the following chemical-physical parameters: Temperature, pH at 25° C., M-alkalinity, concentration of calcium, magnesium, sulphate and chloride ions. The ionic balance is closed by the concentration of sodium ion;

b) calculating the saturation indexes or saturation ratios relating to calcium sulphate and calcium carbonate for each of the critical sections SC1-SC4;

c) identifying the sections subjected to precipitation of calcium sulphate and/or calcium carbonate, or sections run through by liquid streams having calculated saturation ratios for calcium sulphate and/or calcium carbonate higher than 1. In particular, waters having RS of calcium sulphate comprised between 1 and 1.3 and/or RS of calcium carbonate comprised between 1 and 3.2 are considered as having an average scaling nature. Beyond these values, hereinafter also referred to as "attention thresholds", water is considered highly scaling because of one or both the calcium salt(s) mentioned above (see FIG. 2).

d) maintaining or restoring the sustainable chemical conditions with respect to the precipitation of calcium sulphate and calcium carbonate in all the critical (and uncritical) sections of the ZLD system, ensuring saturation ratios of calcium sulphate and calcium carbonate lower than or equal to 1 through time.

In case an action for the maintenance or restoration of such operative conditions that modify the saturation degree of calcium salts, various are the possibilities of intervention. By way of example, we report the corrective actions to be carried out in case the following conditions occur which are in average the most frequent ones:

A. Precipitation of Calcium Sulphate at the Outlet of the Waste Treatment TSD (SC1)

The dosage of calcium hydroxide in the treatment plant for desulfurizing wastes can be set to the minimum necessary level to ensure that the precipitation of earth-alkaline metals does not exceed the limit value of 1.3 for the calcium sulphate saturation ratio.

B. Precipitation of the Calcium Carbonate at the Outlet of the Softening Unit (SC2) and at the Inlet of the Evaporation Step (SC3)

The dosage of sodium carbonate provided in the softening step (up until 110% of the stoichiometric value) drastically reduces the saturation ratio for calcium sulphate (even much lower than 0.5) but can make it difficult to control the precipitation of the calcium carbonate because of increased alkalinity, to which saturation ratios values for calcium carbonate can correspond, which are even higher than 5. In this case, it is necessary to provide for an acidification of the sections affected by precipitation of calcium carbonate, potential or ongoing, until reducing the value of the saturation ratio to comfort values (<1). Such phenomenon can be worsened by mixing softened water, containing a certain residual alkalinity, with the liquid waste coming out from the treatment for desulfurizing wastes TSD, having high concentrations of calcium. This can possibly occur in the presence of a softening by-pass, whose admixture with softened water, before being sent to evaporation, causes the onset of substantial phenomena of precipitation of calcium carbonate.

C. Precipitation of Calcium Sulphate on the Demisters of Desulfurizers (SC4)

In this case a calculation of the saturation ratios on the tank SA is made; however, it is necessary to consider the evaporation caused inside the desulfurizers by direct contact with the combustion flue gas, dividing the attention thresholds of the saturation ratios by the value of the concentration factor, calculated as the ratio between the concentrations of make-up water and water concentrated by evaporation. In this way, values corresponding to approximately half of the above mentioned ones are typically estimated for the new thresholds. Vice versa, it is possible to compare the values of the saturation ratios multiplied by the concentration factor with the attention thresholds, as in FIG. 2. To limit the phenomenon of precipitation on the demisters a shrewd management of the DeSOx wastes is necessary, that allows the optimization of the mixture ratios of the waters in the tank SA. By way of example, a reduction of the make-up flow rate directed to the storage tank SA of water coming out from the waste treatment TSD before softening (stream 1) can cause a corresponding decrease in the saturation ratio of the calcium sulphate until 0.3.

Figure 2:
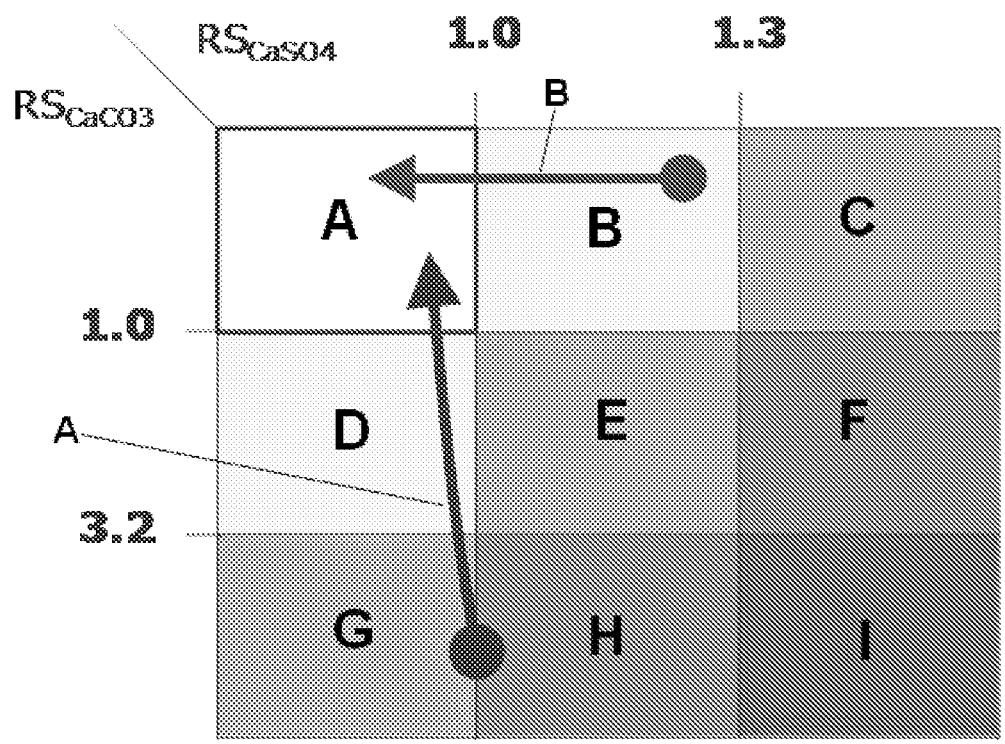
FIG. 2 shows the saturation matrix wherein, by way of example, corrective actions of critical operating conditions are illustrated.

In FIG. 2 the thresholds of the saturation ratios of calcium sulphate and calcium carbonate are represented in a matrix way (saturation matrix). Inside the matrix, solutions paths for some of the critical sections of Table 2, which can be obtained by means of the above mentioned corrective actions, are reported by way of example.

The arrows show the passage from the initial chemical condition, related to the first running of the system, to the final comfort condition, wherein both RS values are lower than 1.

By way of example, letter A represents the evolution of the RS for the feeding of the evaporating stage (SC3) which shows a critical situation of first exercise connected to the precipitation of calcium carbonate, which can be solved by using the method described above. On the contrary, letter B shows an initial critical situation for the precipitation of calcium sulphate in the DeSOx pre-scrubbers (SC4), which can again be solved by using the method described above.

Thanks to the present method the ZLD process in power plants does not produce any liquid waste for emission into surface waters, including ocean, sea, river and lake waters, and the discharge to surface waters in the present ZLD system may be closed, as clearly shown in FIG. 1.

Variations and/or modifications could be made to the method for monitoring and controlling the chemistry of a Zero Liquid Discharge (ZLD) process in power plants according to the present invention without diverting from the scope of the invention itself as defined in the following claims.

The invention claimed is:
1. A method for monitoring and controlling chemistry of a ZLD (Zero Liquid Discharge) system in a power plant, the power plant comprising a treatment plant for desulfurizing flue gas coming from said power plant, a treatment storage disposal unit (TSD) for treatment wastes coming from said flue gas treatment plant, a first fraction of a liquid effluent coming from said TSD unit being sent to an evaporation plant and a second fraction being recycled to a storage tank providing for a liquid make-up to said flue gas treatment plant, said evaporation plant comprising a softening unit and a crystallization-evaporation unit, said method for monitoring and controlling the chemistry of the ZLD system in the power plant comprising:
periodically sampling liquid streams circulating in predetermined, critical sections of said ZLD system, comprising an outlet section from the treatment storage disposal unit of the flue gas treatment plant, an outlet section from the softening unit, a feed section to the crystallization-evaporation unit, and a liquid make-up section from said storage tank to said flue gas treatment plant to determine chemical-physical parameters relating to calcium sulphate and calcium carbonate concentrations at said predetermined, critical sections;
calculating saturation ratios relevant to calcium sulphate and calcium carbonate for each of said predetermined, critical sections;
identifying the, critical sections which are subjected to a precipitation of calcium sulphate or calcium carbonate, wherein liquid streams passing through the critical sections have calculated saturation ratios for calcium sulphate and/or calcium carbonate higher than a prefixed attention threshold; and
carrying out actions comprising variations of reactants/additive dosage to said crystallization-evaporation unit and/or to said treatment storage disposal unit or variation of a ratio between flow rates of said fractions of the liquid effluent coming from said TSD unit, said variations being such to maintain or restore suitable chemical conditions with respect to precipitation of calcium sulphate and calcium carbonate, ensuring saturation ratios for calcium sulphate and calcium carbonate is kept lower than, or equal to 1 through time.

2. The method according to claim 1, wherein to prevent the calcium sulphate precipitation coming from the treatment storage disposal unit (TSD), the method comprises minimizing calcium hydroxide dosage to said TSD unit to ensure precipitation of earth alkaline metals without going beyond a value of 1.3 for the calcium sulphate saturation ratio.

3. The method according to claim 1, wherein a precipitation of calcium carbonate coming out from said softening unit or entering said crystallization-evaporation unit is controlled by acidic treatment.

4. The method according to claim 1, wherein a precipitation of calcium sulphate in a liquid stream fed to the flue gas treatment plant is controlled by reducing a flow rate of said first fraction of liquid effluent coming from the treatment storage disposal unit to said storage tank.

5. The method according to claim 1, wherein said prefixed attention thresholds for the calculated saturation ratios are comprised between 1 and 1.3 for calcium sulphate and 1 and 3.2 for calcium carbonate.

6. The method according to claim 1, wherein said chemical-physical parameters comprise temperature, pH at 25° C., M-alkalinity, concentration of calcium, magnesium, sulphate and chloride ions, and an ionic balance being closed by a concentration of sodium ion.

7. The method according to claim 1, wherein said actions comprise: setting calcium hydroxide without going beyond the value of 1.3 for the saturation ratio of calcium sulphate and/or acidification of liquid streams coming from said softening unit or entering said crystallization-evaporation unit and/or reducing the flow rate of said liquid effluent from said first and second fractions coming from the treatment storage disposal unit to said storage tank.

* * * * *